(12) United States Patent
Albrecht et al.

(10) Patent No.: US 8,536,252 B2
(45) Date of Patent: *Sep. 17, 2013

(54) SEMI CONTINUOUSLY OPERATED METHOD FOR PRODUCING COPOLYMERS

(75) Inventors: Gerhard Albrecht, Prien am Chiemsee (DE); Helmut Mack, Traunstein (DE); Klaus Lorenz, Zangberg (DE); Mario Vierle, Wasserburg (DE); Silke Flakus, Ebersberg (DE); Petra Wagner, Trostberg (DE); Christian Scholz, Wald an der Alz (DE); Harald Grassl, Feichten an der Alz (DE); Barbara Wimmer, Tacherting (DE)

(73) Assignee: Construction Research & Technology GmbH, Trostberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/133,004

(22) PCT Filed: Nov. 25, 2009

(86) PCT No.: PCT/EP2009/065788
§ 371 (c)(1),
(2), (4) Date: Sep. 21, 2011

(87) PCT Pub. No.: WO2010/076095
PCT Pub. Date: Jul. 8, 2010

(65) Prior Publication Data
US 2012/0004350 A1    Jan. 5, 2012

(30) Foreign Application Priority Data
Dec. 8, 2008  (EP) .................................. 08170989

(51) Int. Cl.
*C08F 224/00* (2006.01)
*C08F 2/10* (2006.01)
*C04B 28/28* (2006.01)

(52) U.S. Cl.
USPC .............. 524/5; 526/271; 526/60; 526/317.1; 524/4

(58) Field of Classification Search
USPC .............................. 526/317.1, 60, 271; 524/5
See application file for complete search history.

(56) References Cited

U.S. PATENT DOCUMENTS

| 5,798,425 A | 8/1998 | Albrecht et al. |
| 7,691,921 B2 | 4/2010 | Asano et al. |
| 2006/0183820 A1* | 8/2006 | Asano et al. ................ 524/5 |
| 2007/0161724 A1* | 7/2007 | Moraru et al. ............... 524/59 |
| 2009/0163622 A1 | 6/2009 | Albrecht et al. |
| 2011/0009575 A1 | 1/2011 | Albrecht et al. |

FOREIGN PATENT DOCUMENTS

| DE | 10 2005 061 153 A1 | 6/2007 |
| EP | 0 736 553 A2 | 10/1996 |
| EP | 1 690 877 A1 | 8/2006 |
| WO | WO 2005/075529 A2 | 8/2005 |
| WO | WO 2009/115371 A1 | 9/2009 |

OTHER PUBLICATIONS

PCT/EP2009/065788—International Preliminary Report on Patentability, Jun. 14, 2011.
PCT/EP2009/065788—International Search Report, Mar. 1, 2010.
PCT/EP2009/065788—International Written Opinion, Mar. 1, 2010.

* cited by examiner

*Primary Examiner* — Michael Bernshteyn
(74) *Attorney, Agent, or Firm* — Curatolo Sidoti Co., LPA; Joseph G. Curatolo; Salvatore A. Sidoti

(57) ABSTRACT

A process for the preparation of a copolymer in semicontinuous operation in a polymerization apparatus, comprising a polymerization reactor connected to a metering device, acid monomer being initially taken in the metering device and polyether macromonomer, acid monomer and water in the polymerization reactor, acid monomer being metered from the metering device into the polymerization reactor, the metering of the acid monomer being effected with the proviso that at least 70 mol % of the acid monomer metered in altogether are metered in the course of 5 to 19 minutes at a metering rate that is constant or varies to a limited extent.

21 Claims, No Drawings

SEMI CONTINUOUSLY OPERATED METHOD FOR PRODUCING COPOLYMERS

CROSS REFERENCE TO RELATED APPLICATIONS

This application is a national stage application of International Application No. PCT/EP2009/065788, filed 25 Nov. 2009, which claims priority from European Patent Application Serial No. 08170989.1, filed 8 Dec. 2008, from which applications priority is claimed, and which are incorporated herein by reference.

The present invention relates to a process for the preparation of a copolymer, the copolymer and the use thereof.

It is known that admixtures in the form of dispersants are often added to aqueous slurries of pulverulent inorganic or organic substances, such as clays, silicate powder, chalk, carbon black, crushed rock and hydraulic binders, for improving their processability, i.e. kneadability, spreadability, sprayability, pumpability or flowability. Such admixtures are capable of breaking up solid agglomerates, of dispersing the particles formed and in this way of improving the processability. This effect is utilized also in a targeted manner in particular in the preparation of building material mixtures which contain hydraulic binders, such as cement, lime, gypsum or anhydrite.

In order to convert these building material mixtures based on said binders into a ready-to-use, processable form, as a rule substantially more mixing water is required than would be necessary for the subsequent hydration or hardening process. The portion of cavities formed in the concrete body as a result of the excess, subsequently evaporating water leads to significantly poorer mechanical strengths and stabilities.

In order to reduce this excess proportion of water at a specified processing consistency and/or to improve the processability at a specified water/binder ratio, admixtures which are generally referred to as water-reducing agents or superplasticizers are used. Agents of this type which are used in practice are in particular copolymers which are prepared by free radical copolymerization of acid monomers with polyether macromonomers.

In practice, the copolymerization is generally effected by the semibatch procedure. WO 2005/075529 describes a semicontinuous process for the preparation of said copolymers, in which the polyether macromonomer is initially taken and the acid monomer is then metered in to the initially taken mixture over time. Although the process described is already economical and high-performance superplasticizers are obtained as a product of the process, there is still an aspiration to improve the cost-efficiency of the process and the quality of the product of the process even further.

The object of the present invention is therefore to provide an economical process for the preparation of copolymers which show good performance as dispersants for hydraulic binders, especially as superplasticizers.

This object is achieved by a process for the preparation of a copolymer in semicontinuous operation in a polymerization apparatus, comprising a polymerization reactor connected to a metering device, in each case acid monomer being initially taken in the metering device and polyether macromonomer, acid monomer and water in the polymerization reactor, acid monomer being metered from the metering device into the polymerization reactor, free radical polymerization initiator being passed into the polymerization reactor before and/or during the metering of the acid monomer into the polymerization reactor so that an aqueous medium in which acid monomer and polyether macromonomer are reacted with formation of the copolymer by free radical polymerization forms in the polymerization reactor, the molar ratio of acid monomer used all together to polyether macromonomer used altogether being 20:1 to 1:1, the molar ratio of acid monomer initially taken in the polymerization reactor to the acid monomer metered into the polymerization reactor being 10:1 to 1:10 and the metering of the acid monomer being effected with the proviso that at least 70 mol % of the acid monomer metered in altogether are metered in the course of 5 to 19 minutes at a metering rate that is constant or varies to a limited extent, metering rate which varies to a limited extent meaning that the maximum rate of addition is at most a factor of 3 higher than the minimum rate of addition.

Acid monomer is to be understood as meaning monomers which are capable of free radical copolymerization, have at least one carbon double bond, contain at least one acid function and react as an acid in an aqueous medium. Furthermore, acid monomer is also to be understood as meaning monomers which are capable of free radical polymerization, have at least one carbon double bond and, owing to a hydrolysis reaction in an aqueous medium, form at least one acid function and react as an acid in the aqueous medium (example: maleic anhydride or base-hydrolysable esters, such as ethyl acrylate). In the context of the present invention, polyether macromonomers are compounds which are capable of free radical copolymerization and have at least one carbon double bond and at least two ether oxygen atoms, in particular with the proviso that the polyether macromonomer structural units present in the copolymer have side chains which contain at least two ether oxygen atoms.

A high-quality copolymer product can be prepared in a particularly economical manner by the process according to the invention. The good quality of the copolymer product is based on the substantially more uniform distribution of the comonomer units over the polymer chain and hence substantially improved metering efficiency and performance characteristics, such as water reduction and retention of the processability over time.

The cost-efficiency of the process results in particular from the rapid reaction times associated with the short metering times. It is possible to run more batches per unit time, with the result that substantially larger amounts of copolymers can be produced in the corresponding plant.

In a preferred embodiment of the invention, at least 85 mol % of the acid monomer metered in altogether are metered in the course of 7 to 17 minutes at a metering rate which is constant or varies to a limited extent, metering rate which varies to a limited extent meaning that the maximum rate of addition is at most a factor of 1.7 higher, preferably at most a factor of 1.15 higher, than the minimum rate of addition. In practice, a constant metering rate is generally employed.

As a rule, the reaction of the acid monomer produces in the copolymer a structural unit which is according to the general formulae (Ia), (Ib), (Ic) and/or (Id)

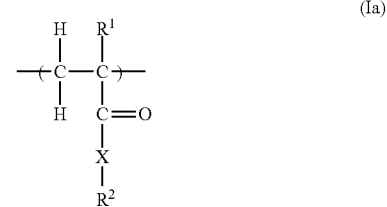

where
- $R^1$ is identical or different and is represented by H and/or a straight-chain or branched $C_1$-$C_4$ alkyl group;
- X is identical or different and is represented by NH—$(C_nH_{2n})$ where n=1, 2, 3 or 4 and/or O—$(C_nH_{2n})$ where n=1, 2, 3 or 4 and/or by a unit not present;
- $R^2$ is identical or different and is represented by OH, $SO_3H$, $PO_3H_2$, O—$PO_3H_2$ and/or para-substituted $C_6H_4$—$SO_3H$, with the proviso that, if X is a unit not present, $R^2$ is represented by OH;

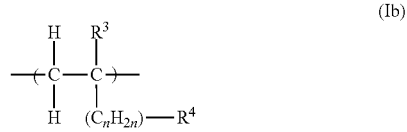

(Ib)

where
- $R^3$ is identical or different and is represented by H and/or a straight-chain or branched $C_1$-$C_4$ alkyl group;
- n=0, 1, 2, 3 or 4;
- $R^4$ is identical or different and is represented by $SO_3H$, $PO_3H_2$, O—$PO_3H_2$ and/or $C_6H_4$—$SO_3H$ present in para-substituted form;

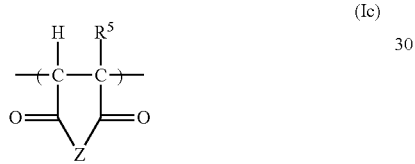

(Ic)

where
- $R^5$ is identical or different and is represented by H and/or a straight-chain or branched $C_1$-$C_4$ alkyl group;
- Z is identical or different and is represented by O and/or NH;

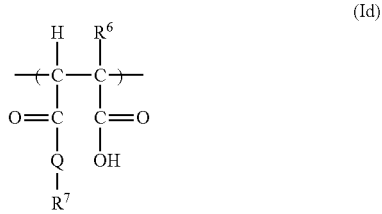

(Id)

where
- $R^6$ is identical or different and is represented by H and/or a straight-chain or branched $C_1$-$C_4$ alkyl group;
- Q is identical or different and is represented by NH and/or O;
- $R^7$ is identical or different and is represented by H, $(C_nH_{2n})$—$SO_3H$ where n=0, 1, 2, 3 or 4, $(C_nH_{2n})$—OH where n=0, 1, 2, 3 or 4; $(C_nH_{2n})$—$PO_3H_2$ where n=0, 1, 2, 3 or 4, $(C_nH_{2n})$—$OPO_3H_2$ where n=0, 1, 2, 3 or 4, $(C_6H_4)$—$SO_3H$, $(C_6H_4)$—$PO_3H_2$, $(C_6H_4)$—$OPO_3H_2$ and/or $(C_mH_{2m})_e$—O-(A'O)$_\alpha$—$R^9$ where m=0, 1, 2, 3 or 4, e=0, 1, 2, 3 or 4, A'=$C_{x'}H_{2x'}$ where x'=2, 3, 4 or 5 and/or $CH_2C(C_6H_5)H$—, α=an integer from 1 to 350 with $R^9$ identical or different and represented by a straight-chain or branched $C_1$-$C_4$ alkyl group.

In general, the acid monomer used is methacrylic acid, acrylic acid, maleic acid, maleic anhydride, a monoester of maleic acid and a mixture of a plurality of these components. Depending on the pH, the acid monomer structural units can also be present in deprotonated form as a salt, in which $Na^+$, $K^+$ and $Ca^{2+}$ are typical as counterions.

In general, a structural unit is produced in the copolymer by the reaction of the polyether macromonomer, which structural unit is according to one of the general formulae (IIa), (IIb) and/or (IIc)

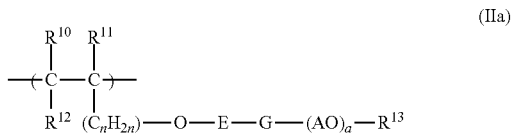

(IIa)

where
- $R^{10}$, $R^{11}$ and $R^{12}$ are in each case identical or different and, independently of one another, are represented by H and/or a straight-chain or branched $C_1$-$C_4$ alkyl group;
- E is identical or different and is represented by a straight-chain or branched $C_1$-$C_6$ alkylene group, a cyclohexyl group, $CH_2$—$C_6H_{10}$, $C_6H_4$ present in ortho-, meta- or para-substituted form and/or a unit not present;
- G is identical or different and is represented by O, NH and/or CO—NH, with the proviso that, if E is a unit not present, G is also present as a unit not present;
- A is identical or different and is represented by $C_xH_{2x}$ where x=2, 3, 4 and/or 5 (preferably x=2) and/or $CH_2CH(C_6H_5)$;
- n is identical or different and is represented by 0, 1, 2, 3, 4 and/or 5;
- a is identical or different and is represented by an integer from 2 to 350 (preferably 10-200);
- $R^{13}$ is identical or different and is represented by H, a straight-chain or branched $C_1$-$C_4$ alkyl group, CO—$NH_2$, and/or $COCH_3$;

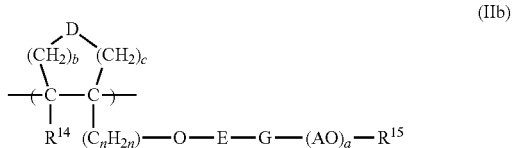

(IIb)

where
- $R^{14}$ is identical or different and is represented by H and/or a straight-chain or branched $C_1$-$C_4$ alkyl group;
- E is identical or different and is represented by a straight-chain or branched $C_1$-$C_6$ alkylene group, a cyclohexyl group, $CH_2$—$C_6H_{10}$, $C_6H_4$ present in ortho-, meta- or para-substituted form and/or by a unit not present;
- G is identical or different and is represented by a unit not present, O, NH and/or CO—NH, with the proviso that, if E is a unit not present, G is also present as a unit not present;
- A is identical or different and is represented by $C_xH_{2x}$ where x=2, 3, 4 and/or 5 and/or $CH_2CH(C_6H_5)$;
- n is identical or different and is represented by 0, 1, 2, 3, 4 and/or 5;
- a is identical or different and is represented by an integer from 2 to 350;

D is identical or different and is represented by a unit not present, NH and/or O, with the proviso that if D is a unit not present: b=0, 1, 2, 3 or 4 and c=0, 1, 2, 3 or 4, where b+c=3 or 4, and with the proviso that if D is NH and/or O: b=0, 1, 2 or 3, c=0, 1, 2 or 3, where b+c=2 or 3;

$R^{15}$ is identical or different and is represented by H, a straight-chain or branched $C_1$-$C_4$ alkyl group, CO—$NH_2$, and/or $COCH_3$;

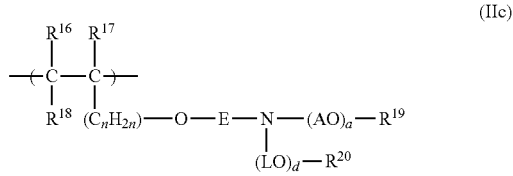

(IIc)

where
- $R^{16}$, $R^{17}$ and $R^{18}$ in each case are identical or different and, independently of one another, are represented by H and/or a straight-chain or branched $C_1$-$C_4$ alkyl group;
- E is identical or different and is represented by a straight-chain or branched $C_1$-$C_6$ alkylene group, a cyclohexyl group, $CH_2$—$C_6H_{10}$ and/or $C_6H_4$ present in ortho-, meta- or para-substituted form;
- A is identical or different and is represented by $C_xH_{2x}$ where x=2, 3, 4 and/or 5 and/or $CH_2CH(C_6H_5)$;
- n is identical or different and is represented by 0, 1, 2, 3, 4 and/or 5;
- L is identical or different and is represented by $C_xH_{2x}$ where x=2, 3, 4 and/or 5 and/or $CH_2$—$CH(C_6H_5)$;
- a is identical or different and is represented by an integer from 2 to 350;
- d is identical or different and is represented by an integer from 1 to 350;
- $R^{19}$ is identical or different and is represented by H and/or a straight-chain or branched $C_1$-$C_4$ alkyl group,
- $R^{20}$ is identical or different and is represented by H and/or a straight-chain $C_1$-$C_4$ alkyl group.

As a rule, the polyether macromonomer used is a vinyl ether having preferably an arithmetic mean number of 4 to 430 oxyalkylene groups.

Frequently, the vinyl ether is present as alkoxylated 1,4-dihydroxybut-1-yl vinyl ether having preferably an arithmetic mean number of 7 to 300 oxyalkylene groups.

In a less preferred embodiment, the polyether macromonomer used may also be alkoxylated isoprenol and/or alkoxylated (meth)allyl alcohol and/or vinylated methylpolyalkylene glycol and/or alkoxylated diethylene glycol having preferably in each case an arithmetic mean number of 4 to 300 oxyalkylene groups.

The alkoxy units of the polyether macromonomers are as a rule present as ethoxy groups or as a mixture of ethoxy and propoxy groups (these polyether macromonomers are obtainable from the ethoxylation or propoxylation of the corresponding monomer alcohols).

Expediently, the aqueous medium is cooled during the reaction. In general, an $H_2O_2$-containing redox initiator system is used as a free radical polymerization initiator, the pH of the aqueous medium being 4.6 to 14.0 and the temperature of the aqueous medium being 5 to 50° C. before the acid monomer is metered in and the pH of the aqueous medium being 4.8 to 6.2 and the temperature of the aqueous medium being 20 to 70° C. after 70 mol % of the acid monomer used altogether has been metered in.

Typically, the temperature of the aqueous medium is 10 to 29° C., preferably 15 to 25° C., before the acid monomer is metered in and 20 to 49° C., preferably 25 to 39° C., after 70 mol % of the acid monomer metered in altogether has been metered in.

Frequently, the free radical polymerization initiator used is an $H_2O_2$/$FeSO_4$-containing redox initiator system which is used together with a reducing agent, the reducing agent preferably being present in the form of sodium sulphite, disodium salt of 2-hydroxy-2-sulphinatoacetic acid, disodium salt of 2-hydroxy-2-sulphonatoacetic acid, sodium hydroxymethanesulphinate, ascorbic acid and/or isoascorbic acid.

As a rule, the aqueous medium is present in the form of an aqueous solution.

In general, altogether at least 45 mol %, preferably at least 80 mol %, of all structural units of the copolymer are produced by incorporation of acid monomer and polyether macromonomer in the form of polymerized units.

Frequently, a chain-transfer agent, which is preferably present in dissolved form, is passed into the polymerization reactor.

The invention also relates to a copolymer which can be prepared by the process described above.

In addition, the present invention relates to the use of this copolymer as a dispersant for hydraulic binders and/or for latently hydraulic binders. The copolymer according to the invention can also be used for example (in particular in dewatered form) as an additive for cement production (grinding aid and "water reducer" for pure Portland cements or composite cements).

The invention is to be illustrated in more detail below with reference to working examples.

SYNTHESIS EXAMPLE 150 g of deionized water and 150 g of vinyloxybutylpolyethylene glycol-5800 (adduct of 129 mol of ethylene oxide with 4-hydroxybutyl-1-monovinyl ether) were initially taken in a glass reactor—equipped with a stirrer, pH electrode and a plurality of feed devices—and were cooled to a starting polymerization temperature of 20° C. (initially taken mixture).

In a separate feed vessel, 7.85 g of acrylic acid were homogeneously mixed with 18.08 g of deionized water. 1.52 g of maleic anhydride were then dissolved in this mixture and 2.88 g of a 50% strength potassium hydroxide solution were added (solution A).

A 6% strength solution of Brüggolit® E 01 (commercial product from Brüggernann Chemicals GmbH) in water was prepared at the same time (solution B).

While stirring and cooling, firstly 15.2 g of solution A were added to the initially taken mixture and then 0.9 g of 3-mercaptopropionic acid was added to the remaining solution.

After that, 0.3 g of 3-mercaptopropionic acid, 0.059 g of iron(II) sulphate heptahydrate and 0.45 g of hydrogen peroxide (50% strength solution in water) were added in succession to the initially taken mixture. At the same time, the addition of solution A and solution B to the stirred initially taken mixture was begun, solution A being added at a constant rate of addition of 98.0 g/h over 10 min.

Solution B was added simultaneously at a constant metering rate of 25.7 g/h until peroxide can no longer be found in the solution.

The polymer solution obtained was then adjusted to a pH of 6.5 with 50% strength sodium hydroxide solution.

The copolymer obtained was present in a slightly yellowish solution which had a solids content of 47.5%. The weight average molar mass of the copolymer was 42 000 g/mol, the polydispersity: 1.5; conversion (determined by means of GPC): 85%.

The starting temperature can be chosen to be relatively high at about 20° C., which means a saving of cooling time in production. The production times are considerably shortened by the short reaction/metering times. It is possible to achieve high solids contents of the product since a high product yield is obtained in a short time.

COMPARATIVE EXAMPLE

Up to the step of metering of solution A at a constant metering rate, the synthesis of the polymer was effected analogously to the synthesis example described above. Thereafter, the procedure was as follows:
- the rate of addition of solution B was a constant 9.0 g/h up to the time when the reaction mixture was free of peroxide
- the remainder of solution A was added simultaneously according to the following metering profile:

| t (min) | 0 | 3 | 6 | 9 | 12 | 15 | 18 | 21 | 24 |
|---|---|---|---|---|---|---|---|---|---|
| Solution A (g/h) | 33.3 | 37.3 | 40 | 40 | 37.3 | 33.3 | 28.3 | 22.3 | 16.6 |

| t (min) | 27 | 33 | 39 | 45 |
|---|---|---|---|---|
| Solution A (g/h) | 11.3 | 4 | 1.3 | 0 |

The copolymer obtained was present in a slightly yellowish solution which had a solids content of 47.0%. The weight average molar mass of the copolymer was 46 000 g/mol; the polydispersity: 1.8; conversion (determined by means of GPC) 81%.

Analysis of the copolymers from the synthesis and comparative examples:

The polymers from the synthesis and comparative examples were analysed by means of size exclusion chromatography with respect to average molar mass and conversion (column combination: OH-Pak SB-G, OH-Pak SB 804 HQ and OH-Pak SB 802.5 HQ from Shodex, Japan; eluent: 80% by volume of aqueous solution of ammonium formate (0.05 mol/l) and 20% by volume of acetonitrile; injection volume 100 μl; flow rate 0.5 ml/min). The calibration for determining the average molar mass was effected using linear polyethylene oxide standards. As a measure of the conversion, the peak of the copolymer is standardized to a relative height of 1 and the area of the peak of the unconverted macromonomer/PEG-containing oligomer is used as a measure of the content of residual monomer.

USE EXAMPLES

The polymers from the synthesis and comparative examples were investigated regarding their properties as concrete superplasticizers in a suitable test system. For this purpose, all polymers were diluted with water to an active substance content of 30% by weight and small amounts of a conventional antifoam were added for controlling the air void content.

First 7.00 kg of a Portland cement CEM I 42.5 R, 2.00 kg of filler Calcit MS 12, 5.45 kg of quartz sand of particle size 0-1 mm, 16.98 kg of sand of particle size 0-4 mm, 5.65 kg of gravel of particle size 4-8 mm and 18.60 kg of gravel of particle size 8-16 mm were dry blended for 10 seconds in a positive mixer. 0.5 kg of water was then added and mixing was effected for a further 120 seconds. Thereafter, 3.61 kg of water were added and mixing was effected for a further 60 seconds. Thereafter, in each case 25.66 g of polymer was added and mixing was effected for a further 60 seconds (corresponds to a water/cement ratio of 0.59 and a polymer dose of 0.11% solids, based on the weight of cement taken). Thereafter, the flow according to DIN EN 12350-5 was determined directly after preparation and after 10 and 30 minutes. The following values were determined:

| Super plasticizer | Flow in cm | | | Slump in cm | | | Slump flow in cm | | |
|---|---|---|---|---|---|---|---|---|---|
| | 0 min | 10 min | 30 min | 0 min | 10 min | 30 min | 0 min | 10 min | 30 min |
| Comparative example | 59.5 | 46.5 | 32 | 24 | 19 | 3 | 57 | 33 | 20 |
| Synthesis example | 60.5 | 51.5 | 34 | 24 | 21 | 3.5 | 58 | 38 | 20 |

The copolymers prepared by the process according to the invention show improved water reduction—evident from the higher initial flow, but at the same time also improved maintenance of consistency, which is attributable to the more homogeneous distribution of the monomer units in the polymer chain. This is also supported by the lower polydispersity of the polymer according to synthesis example 1 in comparison with that of the polymer according to the comparative example, which is a further indicator of a higher homogeneity of the polymer.

The invention claimed is:

1. A process for preparing a copolymer in a semicontinuous mode of operation in a polymerization apparatus containing a polymerization reactor connected to a metering device, the process comprising:
   (a) initially introducing acid monomer into the metering device and initially introducing polyether macromonomer and water into the polymerization reactor,
   (b) metering the acid monomer from the metering device into the polymerization reactor,
   (c) passing free radical polymerization initiator into the polymerization reactor before and/or during the metering of the acid monomer into the polymerization reactor, thereby forming an aqueous medium in the polymerization reactor, and reacting the acid monomer and the polyether macromonomer in the aqueous medium by free radical polymerization, forming the copolymer, wherein the molar ratio of all the acid monomer used to all the polyether macromonomer used is 20:1 to 1:1, the molar ratio of the acid monomer initially introduced into the polymerization reactor to the acid monomer metered into the polymerization reactor is from 10:1 to 1:10, and wherein the metering of the acid monomer is effected with the proviso that at least 70 mol % of all the acid monomer is introduced and metered in during the course of 5 to 19 minutes at a metering rate that is constant or varies such that the maximum rate of addition is at most a factor of 3 higher than the minimum rate of addition.

2. The process according to claim 1, wherein at least 85 mol % of all the acid monomer is introduced and metered in during the course of 7 to 17 minutes at a metering rate which is constant or varies such that the maximum rate of addition is at most a factor of 1.7 higher than the minimum rate of addition.

3. The process according to claim 1, wherein a structural unit is produced in the copolymer by the reaction of the acid monomer, which structural unit is according to one of the general formulae (Ia), (Ib), (Ic) and/or (Id)

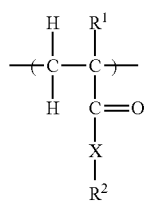
(Ia)

where
$R^1$ is identical or different and is represented by H and/or a straight-chain $C_1$-$C_4$ alkyl group or a branched $C_3$-$C_4$ alkyl group;
X is identical or different and is represented by NH—$(C_nH_{2n})$ where n=1, 2, 3 or 4 and/or O—$(C_nH_{2n})$ where n=1, 2, 3 or 4 and/or by a unit not present;
$R^2$ is identical or different and is represented by OH, $SO_3H$, $PO_3H_2$, O—$PO_3H_2$ and/or para-substituted $C_6H_4$—$SO_3H$, with the proviso that, if X is a unit not present, $R^2$ is represented by OH;

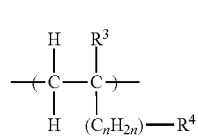
(Ib)

where
$R^3$ is identical or different and is represented by H and/or straight-chain $C_1$-$C_4$ alkyl group or a branched $C_3$-$C_4$ alkyl group;
n=0, 1, 2, 3 or 4;

$R^4$ is identical or different and is represented by $SO_3H$, $PO_3H_2$, O—$PO_3H_2$ and/or $C_6H_4$—$SO_3H$ present in para-substituted form;

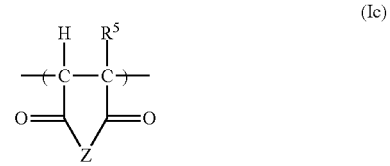
(Ic)

where
$R^5$ is identical or different and is represented by H and/or a straight-chain $C_1$-$C_4$ alkyl group or a branched $C_3$-$C_4$ alkyl group;
Z is identical or different and is represented by O and/or NH;

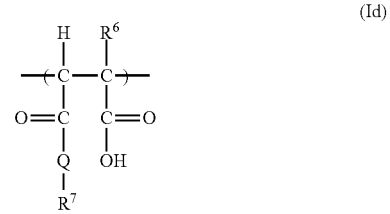
(Id)

where
$R^6$ is identical or different and is represented by H and/or a straight-chain $C_1$-$C_4$ alkyl group or a branched $C_3$-$C_4$ alkyl group;
Q is identical or different and is represented by NH and/or O;
$R^7$ is identical or different and is represented by H, $(C_nH_{2n})$—$SO_3H$ where n=0, 1, 2, 3 or 4, $(C_nH_{2n})$—OH where n=0, 1, 2, 3 or 4; $(C_nH_{2n})$—$PO_3H_2$ where n=0, 1, 2, 3 or 4, $(C_nH_{2n})$—$OPO_3H_2$ where n=0, 1, 2, 3 or 4, $(C_6H_4)$—$SO_3H$, $(C_6H_4)$—$OPO_3H_2$ and/or $(C_mH_{2m})_e$—O-(A'O)$_\alpha$—$R^9$ where m=0, 1, 2, 3 or 4, e=0, 1, 2, 3 or 4, A'=$C_xH_{2x}$ where x'=2, 3, 4 or 5 and/or $CH_2C(C_6H_5)$—, $\alpha$=an integer from 1 to 350 with $R^9$ identical or different and represented by a straight-chain $C_1$-$C_4$ alkyl group or a branched $C_3$-$C_4$ alkyl group.

4. The process according to claim 1, wherein the acid monomer is methacrylic acid, acrylic acid, maleic acid, maleic anhydride, a monoester of maleic acid or a mixture of a plurality thereof.

5. The process according to claim 1, wherein a structural unit is produced in the copolymer by the reaction of the polyether macromonomer, which structural unit is according to one of the general formulae (IIa), (IIb) and/or (IIc)

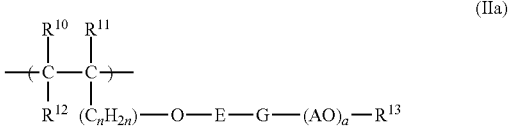
(IIa)

where
$R^{10}$, $R^{11}$ and $R^{12}$ are in each case identical or different and, independently of one another, are represented by H and/or a straight-chain $C_1$-$C_4$ alkyl group or a branched $C_3$-$C_4$ alkyl group;

E is identical or different and is represented by a straight-chain $C_1$-$C_6$ alkylene group or branched $C_3$-$C_6$ alkylene group, a cyclohexyl group, $CH_2$—$C_6C_{10}$, $C_6H_4$ present in ortho-substituted, meta-substituted or para-substituted form and/or a unit not present;

G is identical or different and is represented by O, NH and/or CO—NH with the proviso that, if E is a unit not present, G is also a unit not present;

A is identical or different and is represented by $C_xH_{2x}$ where x=2, 3, 4 and/or 5 and/or $CH_2CH(C_6H_5)$;

n is identical or different and is represented by 0, 1, 2, 3, 4 and/or 5;

a is identical or different and is represented by an integer from 2 to 350;

$R^{13}$ is identical or different and is represented by H, a straight-chain $C_1$-$C_4$ alkyl group or a branched $C_3$-$C_4$ alkyl group, CO—$NH_2$, and/or $COCH_3$;

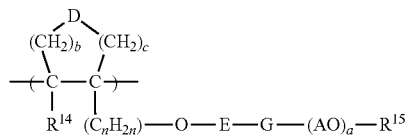

(IIb)

where $R^{14}$ is identical or different and is represented by H and/or a straight-chain $C_1$-$C_4$ alkyl group or a branched $C_3$-$C_4$ alkyl group, E is identical or different and is represented by straight-chain $C_1$-$C_6$ alkylene group or branched $C_3$-$C_6$ alkylene group, a cyclohexyl group, $CH_2$—$C_6H_{10}$, $C_6H_4$ present in ortho-substituted, meta-substituted or para-substituted form and/or by a unit not present;

G is identical or different and is represented by a unit not present, O, NH and/or CO—NH, with the proviso that, if E is a unit not present, G is also a unit not present;

A is identical or different and is represented by $C_xH_{2x}$ where x=2, 3, 4 and/or 5 and/or $CH_2CH(C_6H_3)$;

n is identical or different and is represented by 0, 1, 2, 3, 4 and/or 5;

a is identical or different and is represented by an integer from 2 to 350;

D is identical or different and is represented by a unit not present, NH and/or O, with the proviso that if D is a unit not present: b=0, 1, 2, 3 or 4 and c=0, 1, 2, 3 or 4, where b+c=3 or 4, and with the proviso that if D is NH and/or O: b=0, 1, 2 or 3, c=0, 1, 2 or 3, where b+c=2 or 3;

$R^{15}$ is identical or different and is represented by H, a straight-chain $C_1$-$C_4$ alkyl group or a branched $C_3$-$C_4$ alkyl group, CO—$NH_2$, and/or $COCH_3$;

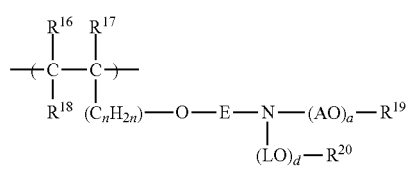

(IIc)

where $R^{16}$, $R^{17}$ and $R^{18}$ in each case are identical or different and, independently of one another, are represented by H and/or a straight-chain $C_1$-$C_4$ alkyl group or a branched $C_1$-$C_4$ alkyl group;

E is identical or different and is represented by a straight-chain $C_1$-$C_6$ alkylene group or branched $C_3$-$C_6$ alkylene group, $CH_2$—$C_6H_{10}$ and/or $C_6H_4$ present in ortho-substituted, meta-substituted or para-substituted form;

A is identical or different and is represented by $C_xH_{2x}$ where x=2, 3, 4 and/or 5 and/or $CH_2CH(C_6H_5)$;

n is identical or different and is represented by 0, 1, 2, 3, 4 and/or 5;

L is identical or different and is represented by $C_xH_{2x}$ where x=2, 3, 4 and/or 5 and/or $CH_2$—$CH(C_6H_5)$;

a is identical or different and is represented by an integer from 2 to 350;

d is identical or different and is represented by an integer from 1 to 350;

$R^{19}$ is identical or different and is represented by H and/or a straight-chain $C_1$-$C_4$ alkyl group or a branched $C_3$-$C_4$ alkyl group, $R^{20}$ is identical or different and is represented by H and/or a straight-chain $C_1$-$C_4$ alkyl group.

6. The process according to claim 1, wherein the polyether macromonomer is a vinyl ether having optionally an arithmetic mean number of 4 to 340 oxyalkylene groups.

7. The process according to claim 6, wherein the vinyl ether is alkoxylated 1,4-dihydroxybut-1-yl vinyl ether having optionally an arithmetic mean number of 7 to 300 oxyalkylene groups.

8. The process according to claim 1, wherein the polyether macromonomer is alkoxylated isoprenol, alkoxylated (meth) allyl alcohol, vinylated methylpolyalkylene glycol or mixtures thereof, having optionally in each case an arithmetic mean number of s4 to 300 oxyalkylene groups.

9. The process according to claim 1, comprising cooling the aqueous medium during the reaction.

10. The process according to claim 1, wherein an $H_2O_2$-containing redox initiator system is used as the free radical polymerization initiator and the pH of the aqueous medium is 4.6 to 14.0 and the temperature of the aqueous medium is 5 to 50° C. before the acid monomer is metered in and the pH of the aqueous medium is 4.8 to 6.2 and the temperature of the aqueous medium is 20 to 70° C. after 70 mol % of all the acid monomer has been introduced and metered in.

11. The process according to claim 10, wherein the temperature of the aqueous medium is 10 to 29° C. before the acid monomer is metered in and the temperature of the aqueous medium is 20 to 49° C. after 70 mol % of the acid monomer has been introduced and metered in.

12. The process according to claim 1, wherein the free radical polymerization initiator is an $H_2O_2$/$FeSO_4$-containing redox initiator system which is used together with a reducing agent.

13. The process according to claim 1, wherein the aqueous medium comprises an aqueous solution.

14. The process according to claim 1, wherein at least 45 mol % of all structural units of the copolymer are produced by incorporation of the acid monomer and the polyether macromonomer in the form of polymerized units.

15. The process according to claim 1, comprising passing a chain-transfer agent which is optionally present in dissolved form into the polymerization reactor.

16. A copolymer prepared by the process according to claim 1.

17. The process of use of a copolymer according to claim 1 as a dispersant comprising adding the copolymer as a dispersant to an aqueous slurry of hydraulic binder and/or of latent hydraulic binder.

18. The process according to claim 1, wherein at least 85 mol % of all the acid monomer is introduced and metered in during the course of 7 to 17 minutes at a metering rate which is constant or varies such that the maximum rate of addition is at most a factor of 1.15 higher than the minimum rate of addition.

19. The process according to claim 12, wherein the reducing agent is sodium sulphite, disodium salt of 2-hydroxy-2-sulphinatoacetic acid, disodium salt of 2-hydroxy-2-sulphonatoacetic acid, sodium hydroxymethanesulphinate, ascorbic acid, isoascorbic acid or mixtures thereof.

20. The process according to claim 1, wherein at least 80 mol % of all structural units of the copolymer are produced by incorporation of acid monomer and the polyether macromonomer in the form of the polymerized units.

21. The process according to claim 10, wherein the temperature of the aqueous medium is 15 to 25° C. before the acid monomer is metered in and the temperature of the aqueous medium is 25 to 39° C. after 70 mol % of all the acid monomer has been introduced and metered in.

\* \* \* \* \*